US008544096B2

(12) United States Patent
Van Brabant (10) Patent No.: US 8,544,096 B2
(45) Date of Patent: Sep. 24, 2013

(54) ON-ACCESS AND ON-DEMAND DISTRIBUTED VIRUS SCANNING

(75) Inventor: Luc Van Brabant, Plaisir (FR)

(73) Assignee: EMC Corporation, Hopkinton, MA (US)

( * ) Notice: Subject to any disclaimer, the term of this patent is extended or adjusted under 35 U.S.C. 154(b) by 2976 days.

(21) Appl. No.: 10/748,008

(22) Filed: Dec. 30, 2003

(65) Prior Publication Data

US 2005/0149749 A1 Jul. 7, 2005

(51) Int. Cl.
*G06F 11/00* (2006.01)
*G06F 12/16* (2006.01)
*G06F 12/14* (2006.01)
*G08B 23/00* (2006.01)

(52) U.S. Cl.
USPC .......................................................... 726/24

(58) Field of Classification Search
USPC .......................................... 726/24; 713/188
See application file for complete search history.

(56) References Cited

U.S. PATENT DOCUMENTS

| | | | |
|---|---|---|---|
| 5,021,949 A | 6/1991 | Morten et al. | 364/200 |
| 5,257,381 A | 10/1993 | Cook | 395/700 |
| 5,367,698 A | 11/1994 | Webber et al. | 395/800 |
| 5,371,850 A | 12/1994 | Belsan et al. | 395/200 |
| 5,475,839 A | 12/1995 | Watson et al. | 395/650 |
| 5,555,396 A | 9/1996 | Alferness et al. | 395/474 |
| 5,613,155 A | 3/1997 | Baldiga | 395/650 |
| 5,619,650 A | 4/1997 | Bach et al. | 395/200.1 |
| 5,623,600 A | 4/1997 | Ji et al. | 713/201 |
| 5,710,923 A | 1/1998 | Jennings | 395/680 |
| 5,787,300 A | 7/1998 | Wijaya | 395/800.01 |
| 5,797,005 A | 8/1998 | Bahls et al. | 395/680 |
| 5,893,140 A | 4/1999 | Vahalia et al. | 711/118 |
| 5,901,327 A | 5/1999 | Ofek | 395/825 |
| 5,918,008 A | 6/1999 | Togawa et al. | 395/186 |
| 5,918,018 A | 6/1999 | Gooderum | 395/200.55 |
| 5,926,636 A | 7/1999 | Lam et al. | 719/313 |
| 5,948,062 A | 9/1999 | Tzelnic et al. | 709/219 |
| 5,960,170 A | 9/1999 | Chen et al. | 714/38 |
| 5,966,531 A | 10/1999 | Skeen et al. | 395/683 |

(Continued)

OTHER PUBLICATIONS

Novell's article: AntiVirus Solutions for Network, Jan. 1, 1999, pp. 1-4.*

(Continued)

*Primary Examiner* — Edan Orgad
*Assistant Examiner* — Harris Wang
(74) *Attorney, Agent, or Firm* — Richard Auchterlonie; Novak Druce Connolly Bove + Quigg LLP (57) ABSTRACT

On-demand and on-access anti-virus scan requests are distributed over a plurality of virus checkers for on-demand anti-virus scanning concurrent with on-access anti-virus scanning. For example, the on-demand requests are grouped into chunks of multiple requests, and the on-demand and on-access requests are combined in a queue. Scanning for requests from a prior chunk are completed before distributing the requests for a next chunk. To give priority to the on-access requests, the on-demand requests are not placed on the queue unless the number of requests on the queue is less than a threshold. An on-access request is placed on the queue in response to a request for user access to the file. On-demand requests are produced in response to a request from a system administrator for anti-virus scanning of the files in a specified file system.

20 Claims, 9 Drawing Sheets

(56) References Cited

U.S. PATENT DOCUMENTS

| | | | |
|---|---|---|---|
| 6,088,803 A | 7/2000 | Tso et al. | 713/201 |
| 6,298,386 B1 | 10/2001 | Vahalia | 709/234 |
| 6,385,727 B1 | 5/2002 | Cassagnol et al. | 713/193 |
| 6,802,012 B1* | 10/2004 | Smithson et al. | 726/24 |
| 7,096,501 B2* | 8/2006 | Kouznetsov et al. | 726/24 |
| 7,188,367 B1* | 3/2007 | Edwards et al. | 726/24 |
| 2002/0129277 A1 | 9/2002 | Caccavale | |
| 2003/0046611 A1* | 3/2003 | Muttik et al. | 714/38 |

OTHER PUBLICATIONS

McAfee Security, May 1, 2002 GroupShield and the Microsoft Virus scanning API.*

Gerald Foster, "*Desktop Management with Novell ZENworks*", Chapter 3, "The Netware Clients and Related Components," 1st Ed. Apr. 2000, O'Reilly & Associates, Inc. http://www.oreilly.com/catalog/novellzen/chapter/ch03.html, 30 pages.

NT Exam Issues, "*NT Server & Workstation (Exams 70-067 & -703) Issues*" by Ken http://www.ftq.com/notes/nt.html, 17 pages, Feb. 10, 2001, archive.org.

*Microsoft Press Computer Dictionary*, 3rd eEd., Microsoft Press, a division of Microsoft Corporation, Redmond, Washington, 1997, p. 500.

*Encyclopedia of Computer Science*, Third Edition, 1995 International Thomson Computer Press, Boston, MA, pp. 329-330.

*Network Anti-Virus Solutions (Info World)*, Aug. 10, 1998 (vol. 20, Issue 32) pp. 1-22, Appearing at http://archive.infoworld.com/cgi-bin/displayArchive.pl?/98/32/virusa.dat.htm, version printed Feb. 23, 2001.

John Phillips, "Antivirus Scanning Best Practices Guide," [TR3107], Network Appliance, Inc. 495 East Java Drive, Sunnyvale, CA 94089, pp. 1-6; http://www.netapp.com/tech_library/3107.html, dated at least as early as Apr. 12, 2001.

John Phillips, "Antivirus Scanning Best Practices Guide," [TR3107]May 28, 2002, Network Appliance, Inc. 495 East Java Drive, Sunnyvale, CA 94089, pp. 1-10; http://www.netapp.com/tech_library/3107.html, dated at least as early as Sep. 12, 2003.

* cited by examiner

ON-ACCESS AND ON-DEMAND DISTRIBUTED VIRUS SCANNING

BACKGROUND OF THE INVENTION

1. Field of the Invention

The present invention relates generally to data processing networks, and more particularly to virus scanning in a data processing network.

2. Description of Related Art

A computer virus is an intrusive program that infects computer files by inserting in those files copies of itself. When a file containing a virus is executed, the virus may replicate and infect other files, and cause damaging side effects.

As data networks become more open to permit a multiplicity of diverse users to share access to files, the networks are subjected to an increasing threat from viruses. The threat has been addressed by restricting the origin of files to trusted sources, and by using virus checker software to scan the files before the files are executed.

Virus checking software has been installed in a variety of locations within a data network. Users are familiar with virus checking software that runs as a background task on personal computers and workstations. This virus checking software has the disadvantage that it may be disabled or in need of updating to recognize new viruses.

Due to the relative difficulty of maintaining virus checking software on workstations in a network, the virus checkers have been installed in proxy servers and file servers in the network. A proxy server can function as a gatekeeper or filter for files received or transmitted by a group of workstations. A proxy server having a virus checker is an effective means for virus protection for services, such as electronic mail, that are insensitive to transmission delay due to the time that the virus checker needs for scanning the files received or transmitted. The scanning time, however, is relatively long compared to the time for data access in a file server. Therefore, it is often expedient to forego virus checking when accessing a file in a file server. This approach demands that any file contained in the file server must have been scanned for possible viruses before reading from the file. The file server, for example, contains a virus checker utility that scans for viruses. When a user closes a file after any write access to the file, the file is scanned for possible viruses that may have been introduced during the user's write access, before any other user is permitted to open the file. If the virus checker in the file server detects a virus in a file, the file remains locked by the operating system of the file server until the infected file is deleted or disinfected.

As described in Frank S. Caccavale, U.S. patent application Ser. No. 09/804,320, filed Mar. 12, 2001, entitled "Using a Virus Checker in One File Server to Check for Viruses in Another File Server," Publication No. US-2002-0129277-A1, incorporated herein by reference, when a network client accesses a file in a network file server, the network file server invokes a conventional virus checker program in an NT file server to transfer pertinent file data from the network file server to random access memory in the NT file server to perform an anti-virus scan. Users may interact with the virus checker program in the usual fashion, to select file types to check, and actions to perform when a virus is detected. This method eliminates the need for porting the virus checker program to the network file server, and avoids maintenance problems when the virus checker program is updated or upgraded. Moreover, a kernel mode driver in the NT file server may provide an indirect interface to the virus checker program for initiating an anti-virus scan. Therefore, the driver supports a wide variety of virus checker programs and ensures continued operation when the virus checker program is upgraded.

SUMMARY OF THE INVENTION

For virus checking of files in a file server, it is desirable to perform "on-access" virus scanning on a priority basis, and "on-demand" virus scanning in background. "On-access" virus scanning occurs when a specified trigger occurs, such a when a user accesses a file marked "unchecked". "On-demand" virus scanning is typically scheduled when a new virus is discovered, when new unchecked files are migrated into a file server, or prior to archiving or backing-up unchecked files.

Priority could be given to the "on-access" virus scan requests by starting an "on-demand" virus scan only when there is no outstanding "on-access" virus scan request that is not being serviced by a virus checker. In a distributed virus scanning environment in which the virus checkers are separate from the file server that produces the virus scan requests, however, this simple method does not keep a steady stream of virus scan requests flowing to virus checkers. Conversely, it is undesirable to have too many "on-demand" virus scan requests outstanding to the virus checkers, or else the system will not give appropriate priority to any burst of "on-access" virus scan requests. Therefore, there is a need for an improved method of allocating the "on-access" and "on-demand" virus scan requests in such a distributed virus scanning environment.

In accordance with one aspect, the invention provides a method of operating a plurality of virus checkers for on-demand anti-virus scanning concurrent with on-access anti-virus scanning. The method includes combining on-demand anti-virus scan requests and on-access anti-virus scan requests in a virus scan request queue, and distributing the on-demand anti-virus scan requests and the on-access anti-virus scan requests from the virus scan request queue to the virus checkers.

In accordance with another aspect, the invention provides a method of operating a plurality of virus checkers. The method includes distributing on-demand anti-virus scan requests and on-access anti-virus scan requests to the virus checkers so that the virus checkers perform on-demand anti-virus scanning concurrent with on-access anti-virus scanning. The method further includes grouping the on-demand anti-virus scan requests into chunks of multiple ones of the on-demand anti-virus scan requests, and for each chunk, distributing the multiple ones of the on-demand anti-virus scan requests over the virus checkers.

In accordance with yet another aspect, the invention provides a method of operating a plurality of virus checkers for on-demand anti-virus scanning concurrent with on-access anti-virus scanning. The method includes combining on-demand anti-virus scan requests and on-access anti-virus scan requests in a virus scan request queue, and a pool of threads distributing the on-demand anti-virus scan requests and the on-access anti-virus scan requests from the virus scan request queue to the virus checkers. Each anti-virus scan request on the virus scan request queue is serviced by a respective one of the threads in the pool of threads. The method further includes grouping the on-demand anti-virus scan requests into chunks of multiple ones of the on-demand anti-virus scan requests, and for each chunk, checking whether the number of anti-virus scan requests on the virus checking queue is less than a threshold, and upon finding that the number of anti-virus scan requests on the virus checking queue is less than the threshold, placing the chunk on the virus scan request queue.

In accordance with still another aspect, the invention provides a virus checking system including a plurality of virus checkers for on-demand anti-virus scanning concurrent with on-access anti-virus scanning, a virus scan request queue, and at least one processor coupled to the virus checkers and the virus scan request queue for sending virus scan requests from the virus scan request queue to the virus checkers. The at least one processor is programmed for placing on-demand anti-virus scan requests and on-access anti-virus scan requests onto the virus scan request queue, and for distributing the on-demand anti-virus scan requests and the on-access virus scan requests from the virus scan request queue to the virus checkers.

In accordance with a final aspect, the invention provides a virus checking system including a plurality of virus checkers for on-demand anti-virus scanning concurrent with on-access anti-virus scanning, and a file server coupled to the virus checkers for sending virus checking requests from the file server to the virus checkers. The file server includes a virus scan request queue. The file server is programmed for placing on-demand anti-virus scan requests and on-access anti-virus scan requests onto the virus scan request queue, and for executing multiple threads for distributing the on-demand anti-virus scan requests and the on-access anti-virus scan requests from the virus scan request queue to the virus checkers. Each anti-virus scan request on the virus scan request queue is serviced by a respective one of the threads in the pool of threads. The file server is further programmed for grouping the on-demand anti-virus scan requests into chunks of multiple ones of the on-demand anti-virus scan requests, and for consecutively placing the chunks onto the virus scan request queue.

BRIEF DESCRIPTION OF THE DRAWINGS

Other objects and advantages of the invention will become apparent upon reading the detailed description with reference to the drawings, in which.

While the invention is susceptible to various modifications and alternative forms, a specific embodiment thereof has been shown by way of example in the drawings and will be described in detail. It should be understood, however, that it is not intended to limit the form of the invention to the particular form shown, but on the contrary, the intention is to cover all modifications, equivalents, and alternatives falling within the scope of the invention as defined by the appended claims.

DESCRIPTION OF ILLUSTRATIVE EMBODIMENTS

Figure 1:
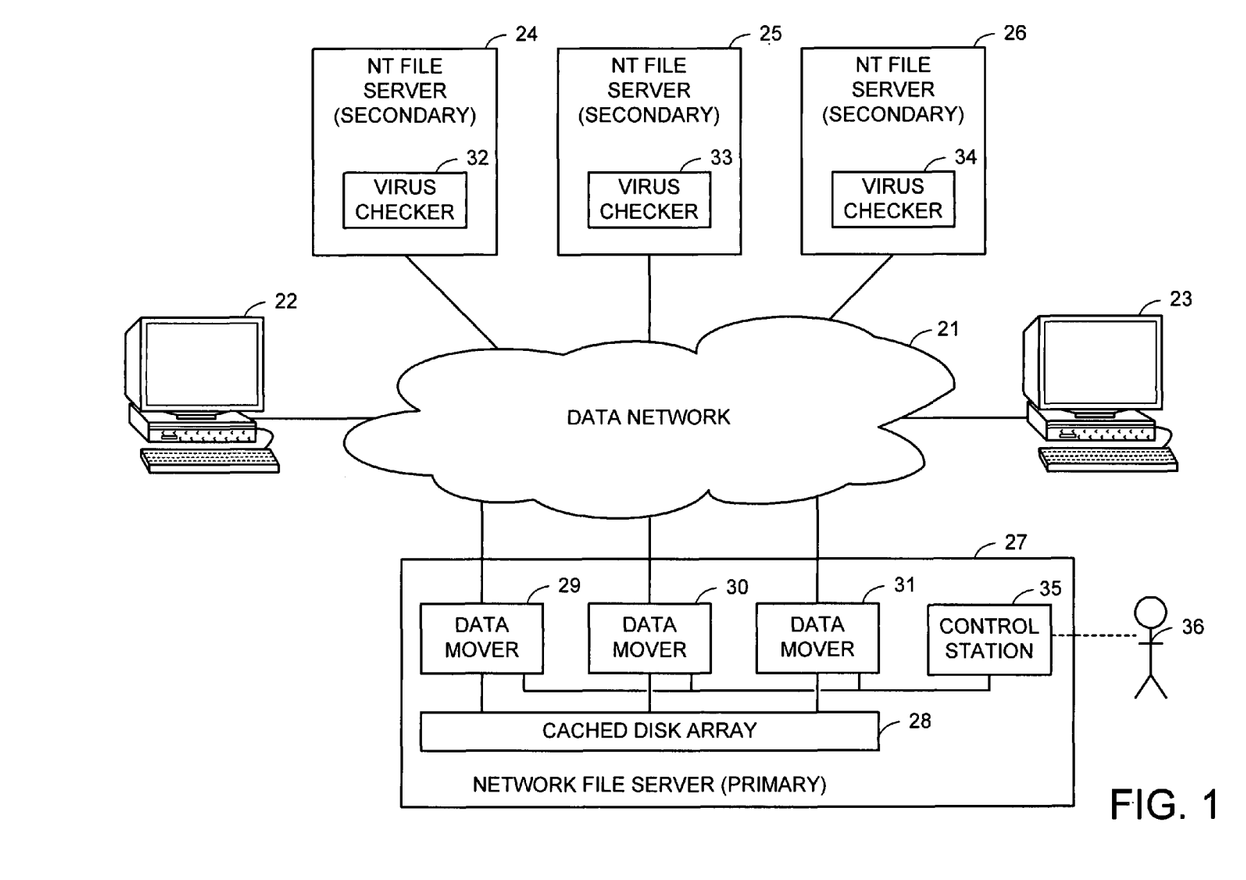
FIG. 1 is a block diagram of a data processing system incorporating the present invention.

With reference to FIG. 1, there is shown a distributed data processing system incorporating the present invention. The data processing system includes a data network 21 interconnecting a number of clients and servers. The data network 21 may include any one or more of network connection technologies, such as Ethernet or Fibre Channel, and communication protocols, such as TCP/IP or UDP. The clients include work stations 22 and 23. The work stations, for example, are personal computers. The servers include conventional Windows NT/2000 file servers 24, 25, 26, and a very large capacity network file server 27. The network file server 27 functions as a primary server storing files in nonvolatile memory. The NT file servers 24, 25, 26 serve as secondary servers performing virus checking upon file data obtained from the network file server 27. The network file server 27 is further described in Vahalia et al., U.S. Pat. No. 5,893,140 issued Apr. 6, 1999, incorporated herein by reference. Such a very large capacity network file server 27 is manufactured and sold by EMC Corporation, 176 South Street, Hopkinton, Mass. 01748.

The network file server 27 includes a cached disk array 28 and a number of data movers 29, 30 and 31. The network file server 27 is managed as a dedicated network appliance, integrated with popular network operating systems in a way, which, other than its superior performance, is transparent to the end user. The clustering of the data movers 29, 30, 31 as a front end to the cached disk array 28 provides parallelism and scalability. Each of the data movers 29, 30, 31 is a high-end commodity computer, providing the highest performance appropriate for a data mover at the lowest cost. The network file server 27 also has a control station 35 enabling a system administrator 36 to configure and control the file server.

Each of the NT file servers 24, 25, 26 is programmed with a respective conventional virus checker 32, 33, 34. The virus checkers are enterprise class anti-virus engines, such as the NAI/McAfee's NetShield 4.5 for NT Server, Symantec Norton AntiVirus 7.5 Corporate Edition for Windows NT, Trend Micro's ServerProtect 5.5 for Windows NT Server. In each of the NT file servers 24, 25, 26, the virus checker 32, 33, 34 is invoked to scan a file in the file server in response to certain file access operations. For example, when the file is opened for a user, the file is scanned prior to user access, and when the file is closed, the file is scanned before permitting any other user to access the file.

The network file server 27, however, is not programmed with a conventional virus checker, because a conventional virus checker needs to run in the environment of a conventional operating system. Network administrators, who are the purchasers of the file servers, would like the network file server 27 to have a virus checking capability similar to the virus checking provided in the conventional NT file servers 24, 25, 26. Although a conventional virus checker could be modified to run in the environment of the data mover operating system, or the data mover operating system could be modified to support a conventional virus checker, it is advantageous for the network file server 27 to use the virus checkers 27, 28, 29 in the NT file servers to check files in the network file server 27 in response to user access of the files in the network file server. This avoids the difficulties of porting a conventional virus checker to the network file server, and maintaining a conventional virus checker in the data mover environment of the network file server. Moreover, in many cases, the high-capacity network file server 27 is added to an existing data processing system that already includes one or more NT file servers including conventional virus checkers. In such a system, all of the files in the NT file servers 24, 25, 26 can be migrated to the high-capacity network file server 27 in order to facilitate storage management. The NT file servers 24, 25, 26 in effect become obsolete for data storage, yet they can still serve a useful function by providing virus checking services to the network file server 27.

In general, when a client 22, 23 stores or modifies a file in the network file server 27, the network file server determines when the file needs to be scanned. When anti-virus scanning of a file has begun, other clients are blocked on any access to that file, until the scan completes on the file. The network file server 27 selects a particular one of the NT file servers 24, 25, 26 to perform the scan, in order to balance loading upon the NT file servers for anti-virus scanning processes. The virus checker in the selected NT file server performs a read-only access of the file to transfer file data from the network file server to random access memory in the selected NT file server in order to perform the anti-virus scan in the NT file server. Further details regarding the construction and operation of the virus checkers 32, 33, 34 and the interface between the virus checkers and the network file server 27 are found in Caccavale United States Patent Application Publication No. US 2002/0129277 A1 published Sep. 12, 2002, incorporated herein by reference.

Figure 2:
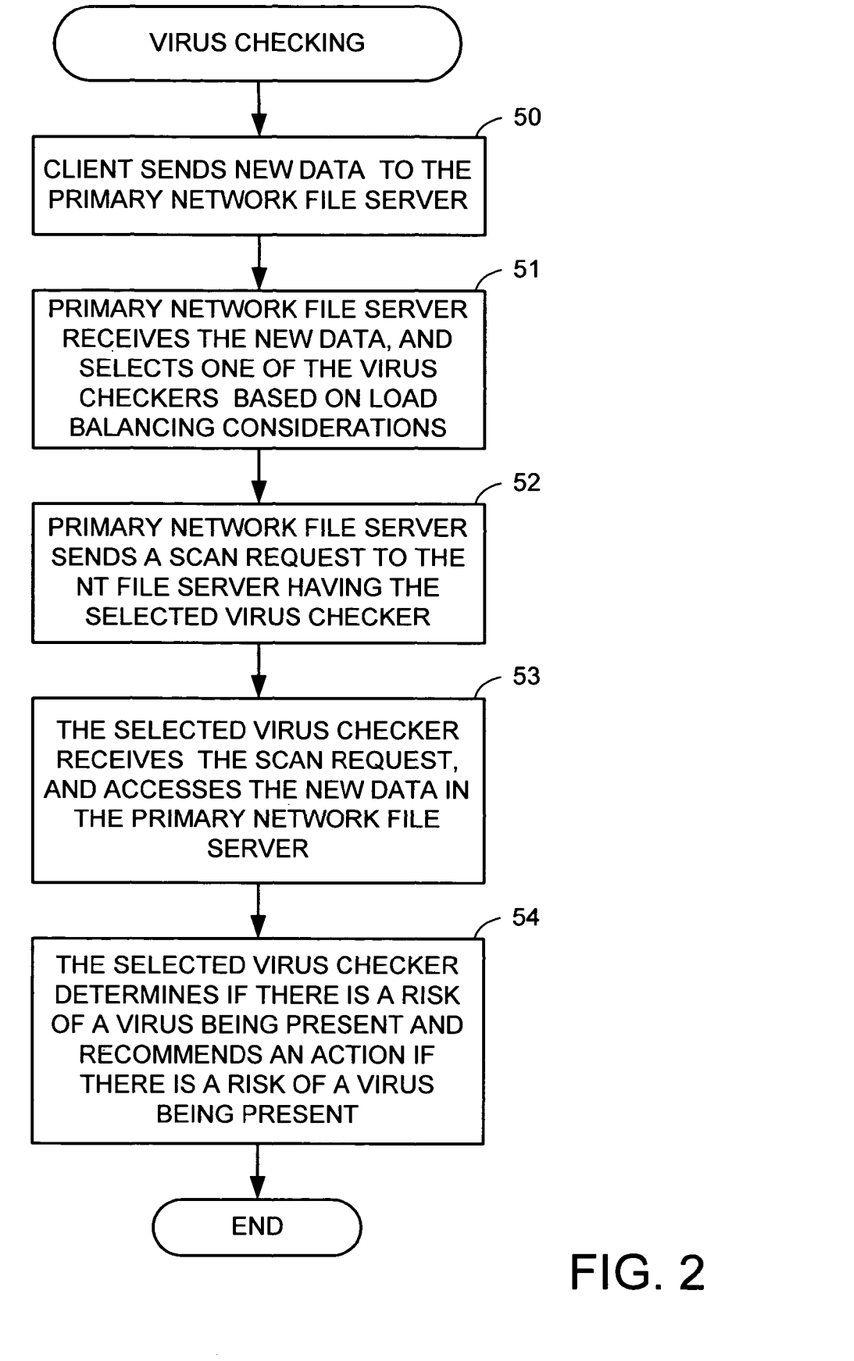
FIG. 2 is a flowchart of a method of using a virus checker in the system of FIG. 1.

With reference to FIG. 2, there is shown a flowchart of a method of using a virus checker in the system of FIG. 1. In a first step 50 of FIG. 2, a client (22, 23 in FIG. 1) sends new data to the primary network file server (27 in FIG. 1). Next, in step 51, the primary network file server receives the new data, and selects one of the virus checkers for load balancing. For example, a virus checker is selected using a "round robin" method that places substantially the same workload upon each of the virus checkers. For the case of the three NT file servers 24, 25, and 26 in FIG. 1, for example, a distribution list [NT1, NT2, NT3] is stored in each data mover, and each time that a virus scan request from a data mover needs to be serviced, the data mover increments a pointer to the distribution list to distribute the scanning requests to the NT file servers in a sequence [NT1, NT2, NT3, NT1, NT2, NT#, NT1, NT2, NT3, . . . ], where NT1 is the name of the first NT file server 24, NT2 is the name of the second NT file sever 25, and NT3 is the name of the third NT file server 26. In general, for the case of a total number N of active virus checkers, and a total workload of W, the load upon each active virus checker is W/N.

In step 52, the primary network file server sends an anti-virus scan request to the NT file server (24, 25, or 26 in FIG. 1) having the selected virus checker (32, 33, or 34). The scan request identifies the new data to be scanned. In step 53, the selected virus checker receives the scan request, and accesses the new data in the primary network file server. In step 54, the selected virus checker determines if there is a risk of a virus being present in the new data, and recommends an action if there is a risk of a virus being present. The virus checking for the new data is finished after step 54.

The scanning task shown in FIG. 2 is generally referred to as an "on-access" virus scan. An "on-access" virus scan is processed in real-time when scanning is triggered by user-initiated file access. Another kind of virus scan is known as an "on-demand" virus scan. An "on-demand" virus scan is scheduled at a lower priority than "on-access," and it typically involves scanning all files of virus-checkable file type in a one or more specified file systems. For example, "on-demand" virus checking is scheduled when a new virus is discovered, when new unchecked files are migrated into a file server, or prior to archiving or backing-up unchecked files. Although lower in priority from a scheduling point of view, "on-demand" virus checking has often been more burdensome on the data processing system than "on-access" virus checking. A full file system scan may generate a much more intense scanning load when a multitude of files in the file system must be scanned. Even though this scanning workload is distributed over multiple virus checkers, the volume of scans will generate a significant resource load on the operating system of the data mover. Moreover, it is desirable to fully utilize the capabilities of the virus checkers in order to complete the full file system scan as soon as possible In order to mitigate any general performance degradation on the data mover during user file access, it is desirable to mix "on-demand" virus scan requests with "on-access" virus scan requests in a shared virus scan request queue. For example, outstanding "on-demand" virus scan requests are added to the shared queue when the number of requests in the shared queue falls below a threshold. The threshold is selected to provide a relatively continuous flow of requests to the virus checkers without significantly degrading the response time of the virus checkers for responding to the "on-access" requests. Moreover, it is desirable to add outstanding "on-demand" virus scan requests to the shared queue in manageable "chunks", and to wait until the virus scan requests in each chunk have been serviced before sending another chunk of "on-demand" virus scan requests.

Figure 3:
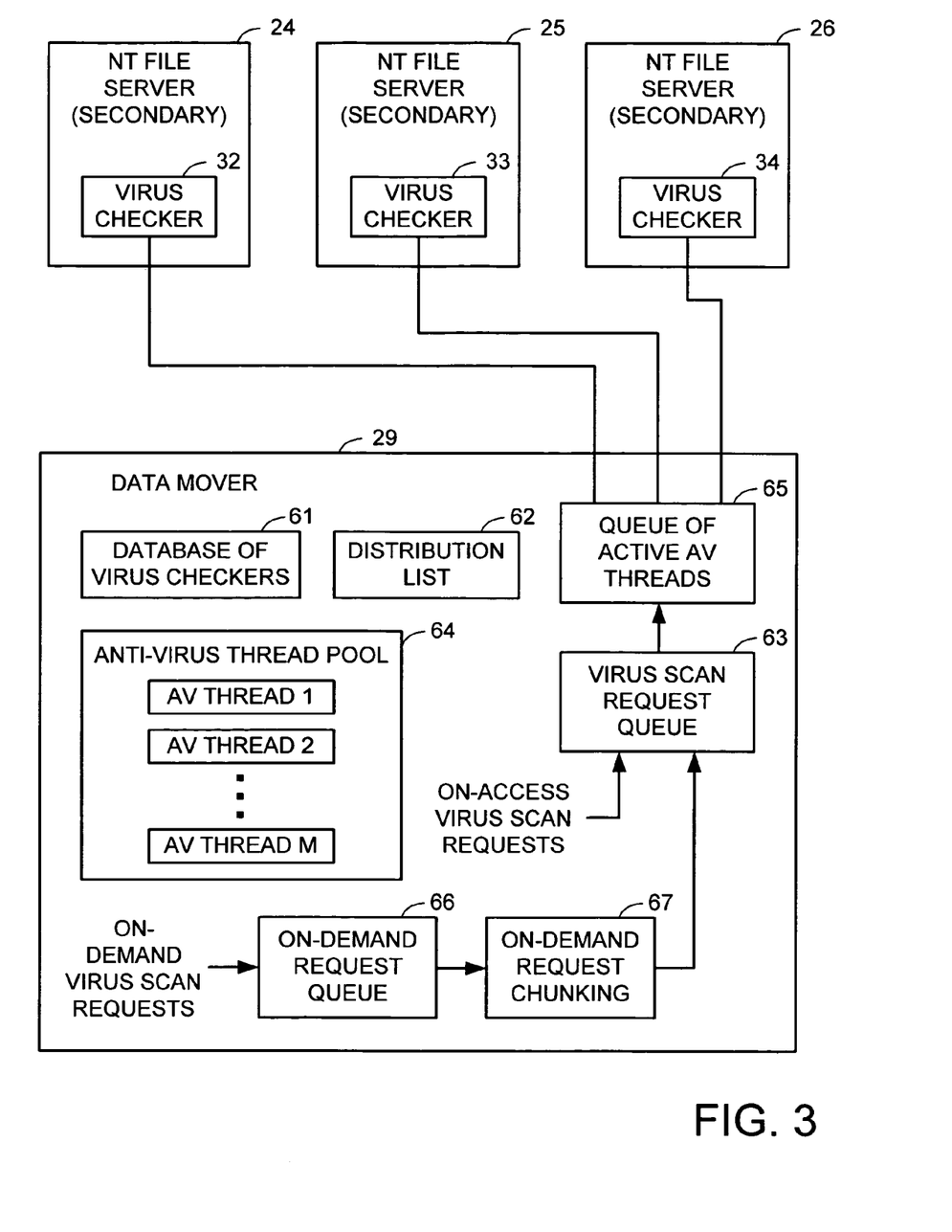
FIG. 3 is a block diagram showing programming and data structures in a data mover in the data processing system of FIG. 1.

As shown in FIG. 3, the data mover 29 stores a database 61 of virus checkers, and a distribution list 62 of the virus checkers that are in a condition to service virus scan requests. Virus scan requests to be serviced are listed in a virus scan request queue 63. The virus scan request queue 63 is serviced by a pool of anti-virus threads 64. Anti-virus threads that are presently servicing virus scan requests are listed in a queue 65 of active anti-virus threads 65.

On-access virus scan requests and on-demand virus scan requests are placed in the virus scan request queue 63. When an on-access virus scan request occurs due to user access to a file that needs to be scanned, the on-access virus scan request is immediately placed on the virus scan request queue 63. When an on-demand virus scan request is received from the system administrator (36 in FIG. 1), the request is placed on an on-demand request queue 66. An on-demand request chunking routine 67 services the on-demand request queue 66 by grouping on-demand anti-virus file scan requests into chunks, and when the number of anti-virus file scan requests in the virus scan request queue is less than a threshold, by inserting each chunk of on-demand anti-virus file scan requests into the virus scan request queue 63.

For example, there are ten anti-virus threads in the anti-virus thread pool 64, there are five virus checkers, and the chunk size is fifty anti-virus file scan requests. The threshold is set to twenty-five. In a more general case of "N" virus checkers and "M" anti-virus threads, for example, the chunk size is the product (M*N), and the threshold is set to one-half of the chunk size.

Figure 4:
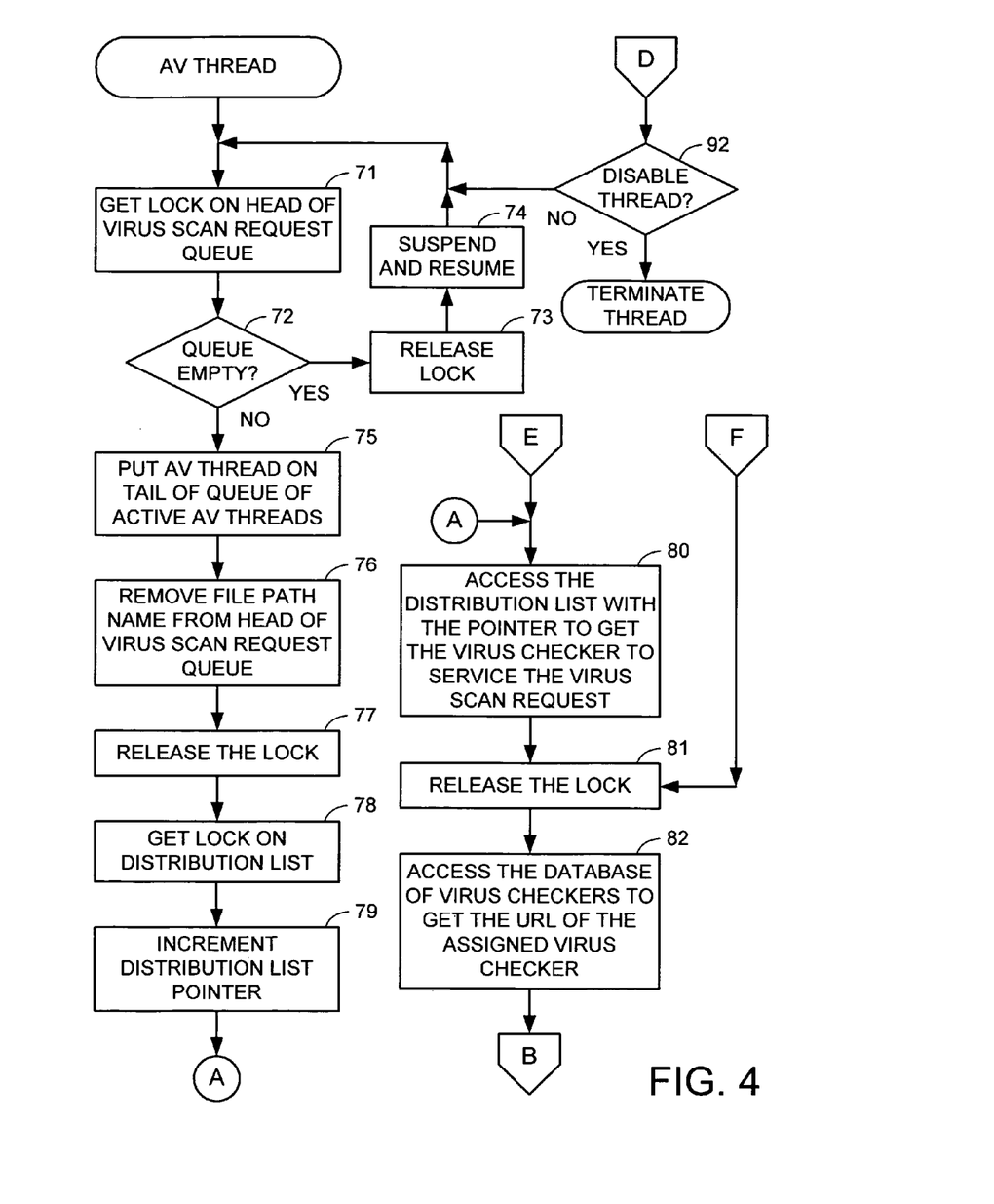
FIGS. 4 to 6 comprise a flowchart of an antivirus (AV) thread in the data mover of FIG. 3.
Figure 5:
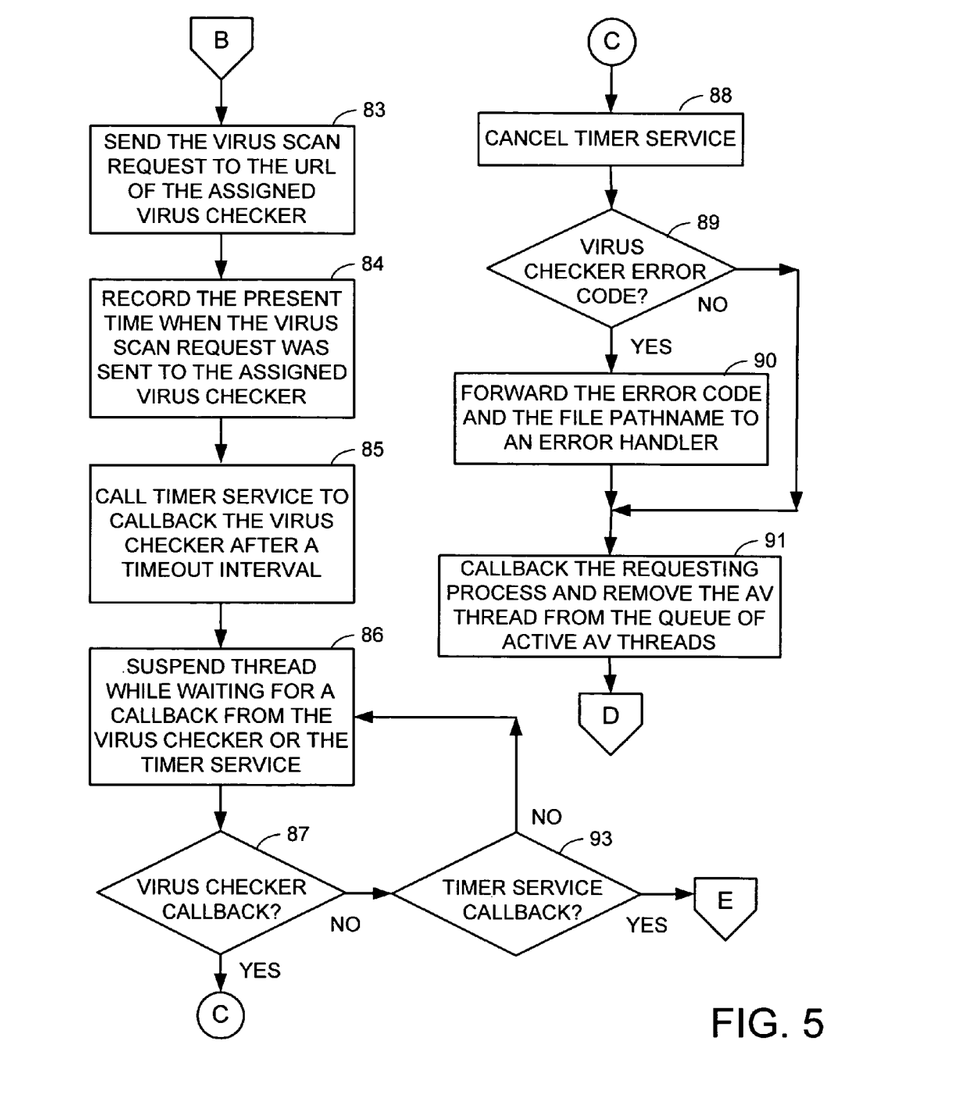
Figure 6:
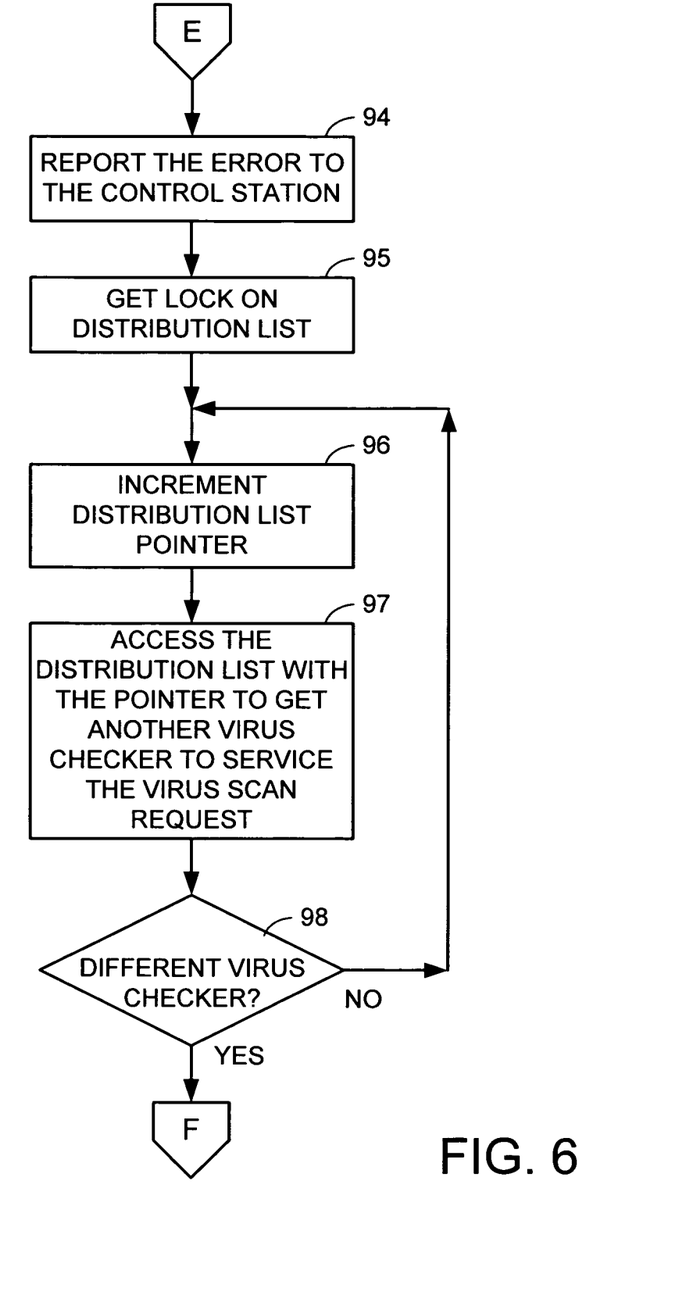

FIGS. 4 to 6 show a flowchart of an antivirus (AV) thread in the data mover of FIG. 3. In a first step 71, the AV thread obtains a lock on the head of the virus scan request queue. In step 72, if the virus scan request queue is empty, then execution branches to step 73, to release the lock. In step 74, execution of the AV thread is suspended for a time, and then execution resumes to loop back to step 71.

In step 72, if the virus scan request queue is not empty, then execution continues to step 75. In step 75, the AV thread is placed on the tail of the queue of active AV threads. In step 76, a file path name is removed from the head of the virus scan request queue. This is the name of the file to be serviced by the AV thread. In step 77, the AV thread releases the lock on the head of the virus scan request queue.

In step 78, the AV thread gets a lock on the distribution list. In step 79, the AV thread increments the distribution list pointer. In step 80, the AV thread accesses the distribution list with the pointer to get the virus checker that will scan the file being serviced by the AV thread. In step 81, the AV thread releases the lock on the distribution list. In step 82, the AV thread accesses the database of virus checkers to get the URL of the virus checker assigned to scan the file being serviced by the AV thread. Execution continues from step 82 to step 83 in FIG. 5.

In step 83 of FIG. 5, the AV thread sends the virus scan request to the URL of the assigned virus checker. In step 84, the AV thread records the present time when the virus scan request was sent to the assigned virus checker. In step 85, the AV thread calls a time service to set up a callback to the virus checker after a timeout interval. In step 86, the AV thread is suspended while waiting for a callback from the assigned virus checker or from the timer service.

In step 87, if the AV thread receives a callback from the assigned virus checker, then execution continues to step 88. In sep 88, the AV thread cancels the timer service. In step 89, the AV thread looks at a return code from the virus checker. If the return code indicates an error condition, then execution continues from step 89 to step 90. In step 90, the AV thread forwards the error code and the file pathname to an error handler. For example, the error code may indicate that a virus has been found in the file, in which case the error handler will log the error and deny user access to the file. Execution continues from step 90 to step 91. Execution also continues to step 91 from step 89 if the virus checker did not return an error.

In step 91, the AV thread sends a callback to the process that requested the virus scan of the file, and the AV thread is removed from the queue of active AV threads. Execution continues from step 91 to step 92 in FIG. 4. In step 92, the AV thread tests a flag to see if the control station has disabled the AV thread. If so, then the AV thread terminates. Otherwise, execution loops from step 92 back to step 71.

In step 87 in FIG. 5, if the callback was not from the assigned virus checker, then execution continues to step 93. In step 93, the callback should be from the timer service. If not, then execution loops back to step 86. Otherwise, execution continues from step 93 to step 94 in FIG. 6. In step 94, the AV thread reports the time-out error to the control station. The AV thread assumes that the virus checker is defective, and therefore, in steps 95 to 98, the virus checker re-assigns the virus checking task to another virus checker. In step 95, the AV thread gets a lock on the distribution list. In step 96, the AV thread increments the distribution list pointer. In step 97, the AV thread accesses the distribution list with the pointer to get another virus checker to service the virus scan request. In step 98, if the pointer does not point to a virus checker that is different from the virus checker that had been assigned to the request, then execution loops back to step 96 to assign the next virus checker in the distribution list. Once a different virus checker has been assigned, execution loops back from step 98 to step 81 in FIG. 4.

Figure 7:
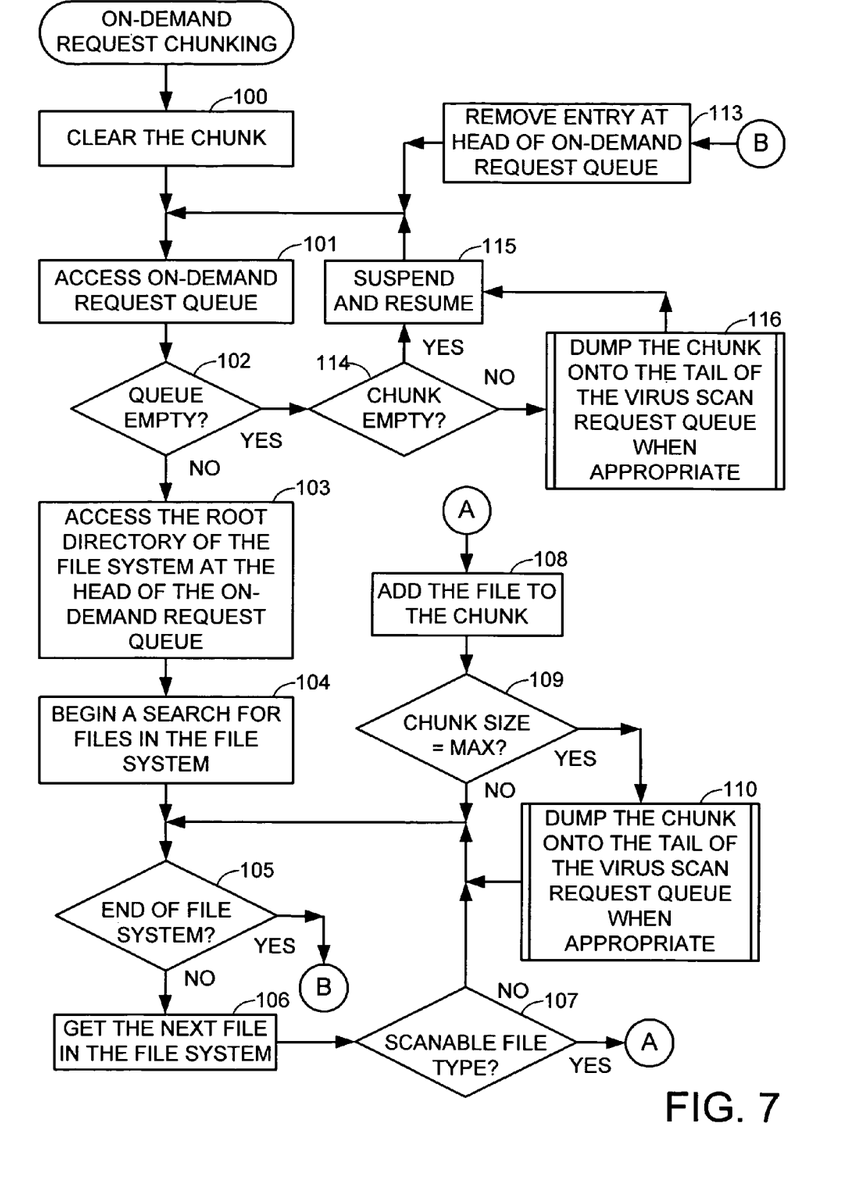
FIG. 7 is a flowchart of an on-demand request chunking thread in the data mover of FIG. 3.

FIG. 7 shows a flowchart of the routine for on-demand request chunking. This routine services the on-demand request queue (66 in FIG. 3). For each file system listed in the on-demand request queue, the routine finds the files that should be scanned for viruses, and groups these files into chunks that are consecutively placed on the virus scan request queue (66 in FIG. 3).

In a first step 100 of FIG. 7, a list of files, called the chunk, is cleared. Next, in step 101, the chunking routine accesses the on-demand request queue. If the queue is not empty, then execution continues to step 103. In step 103, the chunking routine accesses the root directory of the file system at the head of the on-demand request queue. In step 104, the chunking routine begins a search for all of the files in the file system. In step 105, if the end of the file system has not been reached, then execution continues to step 106. In step 106, the chunking routine gets the next file in the file system. In step 107, if the file type is such that the file should not be scanned (e.g., it is not an executable file), then execution loops back to step 105. Otherwise, execution continues from step 107 to step 108. In step 108, the file is added to the chunk. In step 109, if the size of the chunk has not reached the maximum number of files for the chunk, then execution loops back to step 105. Otherwise, execution branches to step 110. In step 110, a subroutine shown in FIG. 8 dumps the chunk onto the tail of the virus scan request queue when it is appropriate to do so. After step 110, execution loops back to step 105.

In step 105, once the end of the file system has been reached, then execution branches to step 113. In step 113, the request chunking routine removes the entry at the head of the one-demand request queue, and execution loops back to step 101.

In step 102, once the on-demand request queue is empty, execution branches to step 114. In step 114, if the chunk is empty, then execution continues to step 115 to suspend and resume the request chunking routine. From step 115, execution loops back to step 101.

In step 114, if the chunk is not empty, then execution continues to step 116. In step 116, the subroutine of FIG. 8 dumps the chunk onto the tail of the virus scan request queue when it is appropriate to do so. From step 116, execution continues to step 115.

Figure 8:
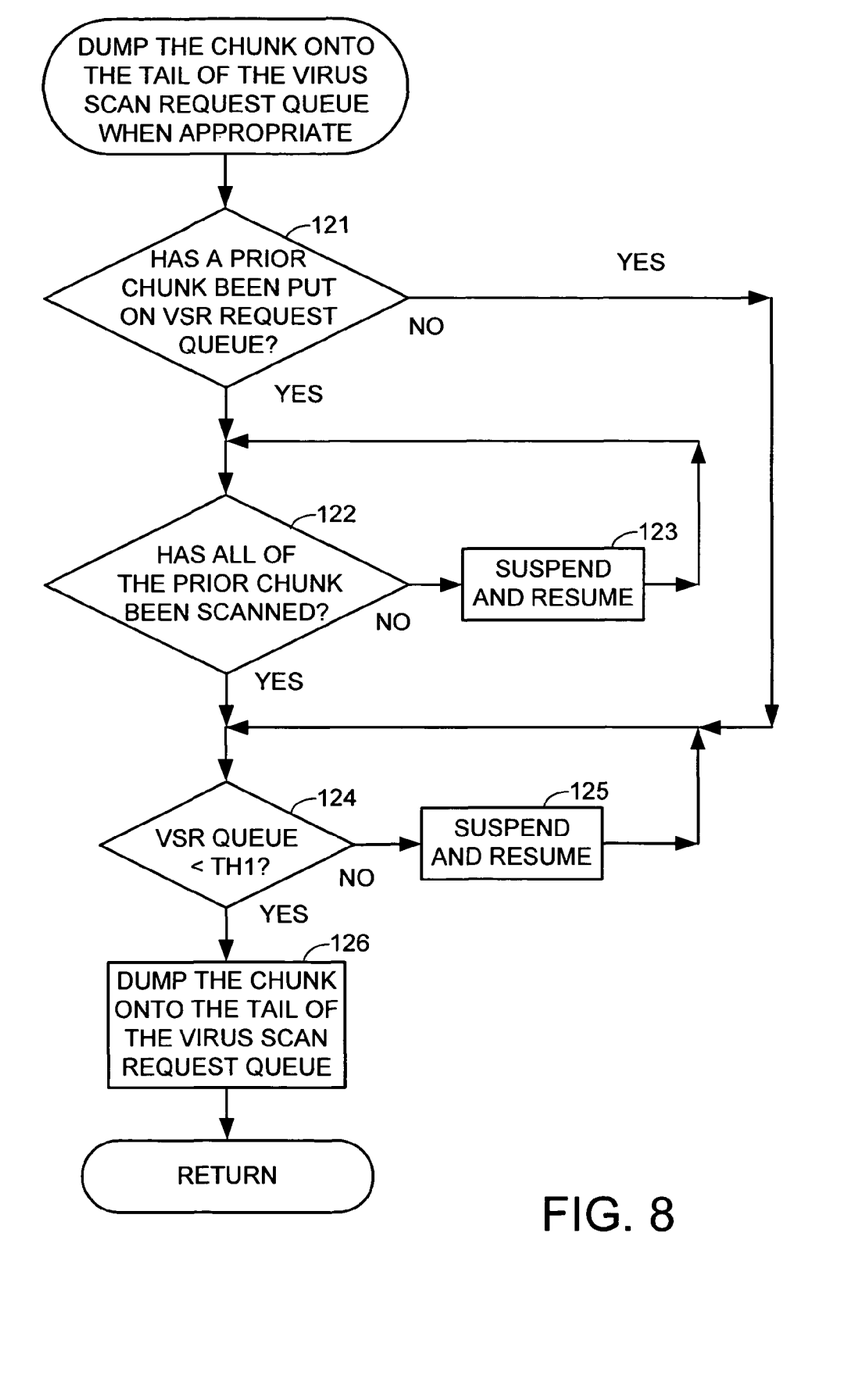
FIG. 8 is a flowchart of a subroutine used in FIG. 7 for dumping a chunk of on-demand virus checking requests onto the virus scan request queue.

FIG. 8 shows the subroutine referenced in steps 110 and 116 of FIG. 7 for dumping the chunk onto the tail of the virus scan request queue when it is appropriate to do so. In a first step 121 of FIG. 8, execution continues to step 122 if a prior chunk has been put on the virus scan request queue. In step 121, if all of the files in the prior chunk have not been scanned, then execution branches to step 123. In step 123, execution is suspended and resumes, and execution loops back to step 122. Once all of the files in the prior chunk has been scanned, execution continues from step 122 to step 124. Execution also branches from step 121 to step 124 if a prior chunk has not been put on the virus scan request queue.

In step 124, if the number of entries in the virus scan request (VSR) queue is not less than the threshold (TH1), then execution continues to step 125 to suspend and resume execution. After step 125, execution loops back to step 124. Once the number of entries in the virus scan request queue is less than the threshold (TH1), execution continues to step 126. In step 126, the list of file names from the chunk are dumped onto the tail of the virus scan request queue, and execution returns.

Figure 9:
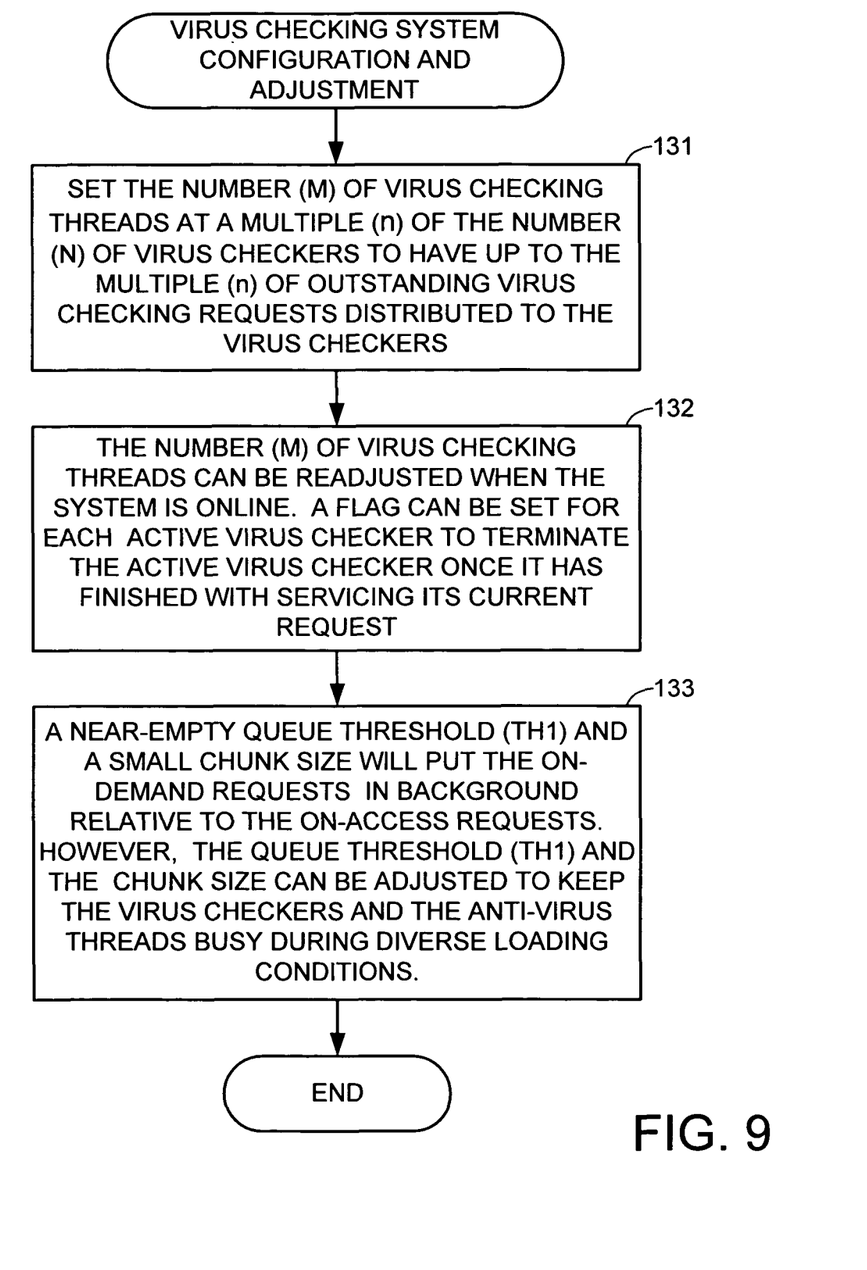
FIG. 9 is a flowchart of a procedure for virus checking system configuration and adjustment.

FIG. 9 shows a flowchart of a procedure for configuration and adjustment of the virus checking system. In a first step 131, the number (M) of virus checking threads is set at a multiple (n) of the number (N) of virus checkers in order to have up to the multiple (n) of outstanding virus checking requests distributed to each of the virus checkers. In step 132, the number (M) of virus checking threads can be readjusted when the virus checking system is online. For example, a flag (tested in step 92 of FIG. 4) can be set for each active virus checker to terminate the active virus checker once it has finished with servicing of a current request. In step 133, the queue threshold (TH1) and the chunk size can be adjusted to set the relative priority of the on-demand requests relative to the on-access requests. A near-empty queue threshold (TH1) and a relatively small chunk size will result in the on-demand requests being placed entirely in background during high loading conditions. However, a larger chunk size and a larger queue threshold will tend to keep the virus checkers busy under diverse loading conditions.

In view of the above, on-demand and on-access virus scan requests are distributed over a plurality of virus checkers for on-demand anti-virus scanning concurrent with on-access anti-virus scanning. This method reduces the scan time for on-demand scanning of a file system and eliminates a potential single point of failure since more than one virus checker is used for scanning of the file system. The method can also keep multiple virus checkers busy scanning the files in the file system without substantially reducing the availability of the virus checkers for on-access virus checking. For example, the on-demand anti-virus scan requests are grouped into chunks of multiple requests, and the on-demand and on-access requests are combined in a queue. Scanning for requests from a prior chunk are completed before distributing the requests for a next chunk. To give priority to the on-access requests, the on-demand requests are not placed on the queue unless the number of requests on the queue is less than a threshold. An on-access request for anti-virus scanning of a file is placed on the queue in response to a request for user access to the file. On-demand requests are produced in response to a request from a system administrator for anti-virus scanning of the files in a specified file system.

What is claimed is:

1. A method of operating a plurality of virus checkers for on-demand anti-virus scanning concurrent with on-access anti-virus scanning, the method comprising:
   combining on-demand anti-virus scan requests and on-access anti-virus scan requests in a virus scan request queue; and
   distributing the on-demand anti-virus scan requests and the on-access anti-virus scan requests from the virus scan request queue to the virus checkers;
   which includes grouping the on-demand anti-virus scan requests into chunks, each of the chunks including multiple ones of the on-demand anti-virus scan requests, and placing the chunks onto the virus scan request queue.

2. The method as claimed in claim 1, which includes inhibiting the placement of at least one of the chunks onto the virus scan request queue until completion of anti-virus scanning for the anti-virus scan requests in a prior one of the chunks.

3. A method of operating a plurality of virus checkers, the method comprising:
   distributing on-demand anti-virus scan requests and on-access anti-virus scan requests to the virus checkers so that the virus checkers perform on-demand anti-virus scanning concurrent with on-access anti-virus scanning;
   which includes grouping the on-demand anti-virus scan requests into chunks, each of the chunks including multiple ones of the on-demand anti-virus scan requests, and for each chunk, distributing the multiple ones of the on-demand anti-virus scan requests over the virus checkers; and
   which includes inhibiting the distribution of the multiple ones of the on-demand anti-virus scan requests from at least one of the chunks to the virus checkers until completion of anti-virus scanning for the anti-virus scan requests in a prior one of the chunks.

4. A method of operating a plurality of virus checkers for on-demand anti-virus scanning concurrent with on-access anti-virus scanning, the method comprising:
   combining on-demand anti-virus scan requests and on-access anti-virus scan requests in a virus scan request queue; and
   a pool of threads distributing the on-demand anti-virus scan requests and the on-access anti-virus scan requests from the virus scan request queue to the virus checkers, each anti-virus scan request on the virus scan request queue being serviced by a respective one of the threads in the pool of threads,
   which includes grouping the on-demand anti-virus scan requests into chunks, each of the chunks including multiple ones of the on-demand anti-virus scan requests, and for each chunk, checking whether the number of anti-virus scan requests on the virus checking queue is less than a threshold, and upon finding that the number of anti-virus scan requests on the virus checking queue is less than the threshold, placing said each chunk on the virus scan request queue.

5. The method as claimed in claim 4, wherein the on-access anti-virus scan requests are produced in response to user access to files.

6. The method as claimed in claim 4, wherein the on-demand anti-virus scan requests are produced in response to a system administrator requesting a scan of files within a specified file system.

7. The method as claimed in claim 4, which includes inhibiting the placement of at least one of the chunks onto the virus scan request queue until completion of anti-virus scanning for the anti-virus scan requests in a prior one of the chunks.

8. A virus checking system comprising:
   a plurality of virus checkers for on-demand anti-virus scanning concurrent with on-access anti-virus scanning;
   a virus scan request queue; and
   at least one processor coupled to the virus checkers and the virus scan request queue for sending virus scan requests from the virus scan request queue to the virus checkers, said at least one processor being programmed for placing on-demand anti-virus scan requests and on-access anti-virus scan requests onto the virus scan request queue, and for distributing the on-demand anti-virus scan requests and the on-access virus scan requests from the virus scan request queue to the virus checkers;
   wherein said at least one of the processors is programmed for grouping the on-demand anti-virus scan requests into chunks, each of the chunks including multiple ones of the on-demand anti-virus scan requests, and placing the chunks onto the virus scan request queue.

9. The virus checking system as claimed in claim 8, which includes inhibiting the placement of at least one of the chunks onto the virus scan request queue until completion of anti-virus scanning for the anti-virus scan requests in a prior one of the chunks.

10. A virus checking system comprising:
    a plurality of virus checkers for on-demand anti-virus scanning concurrent with on-access anti-virus scanning; and
    a file server coupled to the virus checkers for sending virus scan requests to the virus checkers, the file server including a virus scan request queue, and the file server being programmed for placing on-demand anti-virus scan requests and on-access anti-virus scan requests onto the virus scan request queue; and for executing multiple threads for distributing the on-demand anti-virus scan requests and the on-access anti-virus scan requests from the virus scan request queue to the virus checkers, each anti-virus scan request on the virus scan request queue being serviced by a respective one of the threads in the pool of threads, the file server further being programmed for grouping the on-demand anti-virus scan requests into chunks, each of the chunks including multiple ones of the on-demand anti-virus scan requests, and for consecutively placing the chunks onto the virus scan request queue.

11. The virus checking system as claimed in claim 10, wherein the file server is programmed for producing the on-access anti-virus scan requests in response to user access to files.

12. The virus checking system as claimed in claim 10, wherein the file server is programmed to produce the on-demand anti-virus scan requests in response to a system administrator requesting a scan of files within a specified file system.

13. The virus checking system as claimed in claim 10, wherein the file server is programmed for checking for each chunk whether the number of anti-virus scan requests on the virus checking queue is less than a threshold, and upon finding that the number of anti-virus scan requests on the virus checking queue is less than the threshold, placing said each chunk on the virus scan request queue.

14. The virus checking system as claimed in claim 10, wherein the file server is programmed for inhibiting the placement of at least one of the chunks onto the virus scan request queue until completion of anti-virus scanning for the anti-virus scan requests in a prior one of the chunks.

15. A method of operating plurality of virus checkers for on-demand anti-virus scanning concurrent with on-access anti-virus scanning, the method comprising:
   combining on-demand anti-virus scan requests and on-access anti-virus scan requests in a virus scan request queue; and
   a pool of threads distributing the on-demand anti-virus scan requests and the on-access anti-virus scan requests from the virus scan request queue to the virus checkers, each anti-virus scan request on the virus scan request queue being serviced by a respective one of the threads in the pool of threads;
   which includes grouping the on-demand anti-virus scan requests into chunks, each of the chunks including multiple ones of the on-demand anti-virus scan requests, and for each chunk, checking whether the number of anti-virus scan requests on the virus checking queue is less than a threshold, and upon finding that the number of anti-virus scan requests on the virus checking queue is less than the threshold, placing said each chunk on the virus scan request queue;
   wherein the chunks have a size equal to a certain number of on-demand anti-virus scan requests, and the certain number of on-demand anti-virus scan requests is substantially equal to the product of the number of virus checkers and the number of threads in the pool of threads.

16. The method as claimed in claim 4, wherein the chunks have a size equal to a certain number of on-demand anti-virus scan requests, and the threshold is about one-half of the size.

17. The method as claimed in claim 15, wherein the threshold is one-half of the size.

18. A virus checking system comprising:
   a plurality of virus checkers for on-demand anti-virus scanning concurrent with on-access anti-virus scanning; and
   a file server coupled to the virus checkers for sending virus scan requests to the virus checkers, the file server including a virus scan request queue, and the file server being programmed for placing on-demand anti-virus scan requests and on-access anti-virus scan requests onto the virus scan request queue; and for executing multiple threads for distributing the on-demand anti-virus scan requests and the on-access anti-virus scan requests from the virus scan request queue to the virus checkers, each anti-virus scan request on the virus scan request queue being serviced by a respective one of the threads in the pool of threads, the file server further being programmed for grouping the on-demand anti-virus scan requests into chunks, each of the chunks including multiple ones of the on-demand anti-virus scan requests, and for consecutively placing the chunks onto the virus scan request queue;
   wherein the chunks have a size equal to a certain number of on-demand anti-virus scan requests, and the certain number of on-demand anti-virus scan requests is equal to the product of the number of virus checkers and the number of threads in the pool of threads.

19. The virus checking system as claimed in claim 13, wherein the chunks have a size equal to a certain number of on-demand anti-virus scan requests, and the threshold is one-half of the size.

20. The virus checking system as claimed in claim 18, wherein the file server is programmed for checking for each chunk whether the number of anti-virus scan requests on the virus checking queue is less than a threshold, and upon finding that the number of anti-virus scan requests on the virus checking queue is less than the threshold, placing said each chunk on the virus scan request queue, and
   wherein the threshold is one-half of the size.

\* \* \* \* \*